Feb. 24, 1942.   O. E. DEVER   2,273,840

ELECTRIC MOTOR WHEEL

Filed Sept. 16, 1940

INVENTOR.
Otto E. Dever
BY Carlos G. Stratton
ATTORNEY

Patented Feb. 24, 1942

2,273,840

UNITED STATES PATENT OFFICE 2,273,840

ELECTRIC MOTOR WHEEL

Otto E. Dever, Huntington Park, Calif.

Application September 16, 1940, Serial No. 356,907

13 Claims. (Cl. 172—287)

My invention relates to electric motor wheels which are adapted to form the traction wheels of vehicles and are employed in conjunction with suitable sources of electric energy such as Diesel-electric, or gas-electric units carried on the vehicle.

An object of my invention is to provide an electric motor wheel which is designed for heavy duty; that is, for use as a traction wheel of a truck, trailer or bus, and for such use is particularly adapted to incorporate dual tires.

Another object is to provide an electric motor wheel which, while particularly suited for use with dual tires may incorporate only a single tire.

A further object is to provide an electric motor wheel which includes a novel tire or rim supporting frame which combines the felly, hub and connecting means into a single unitary structure, the frame being so arranged that the sole load carrying connection between the felly and hub is located at the axially inner side of the wheel whereby a large unobstructed space is provided for mounting the electric motor unit.

A still further object is to provide an electric motor wheel in which the commutator and brushes of the electric motor are readily accessible, and in which the entire motor or any part thereof may be removed without removing the wheel from the vehicle.

A still further object is to provide an electric motor wheel in which the moving parts are reduced to a minimum, and particularly an electric motor wheel in which the mounting shaft, commutator and armature do not rotate.

A still further object is to provide an electric motor wheel wherein the tire or tires may be centered with respect to the wheel bearings, and the center of torque of the electric motor.

A still further object is to provide on the whole a rugged, sturdy, electric motor wheel capable of withstanding the extreme service required.

The invention also comprises novel details of construction and novel combinations and arrangements of parts, which will more fully appear in the course of the following description. However, the drawing merely shows and the following description merely describes one embodiment of the present invention, which is given by way of illustration or example only.

In the drawing, like reference characters designate similar parts in the several views.

Figure 2:
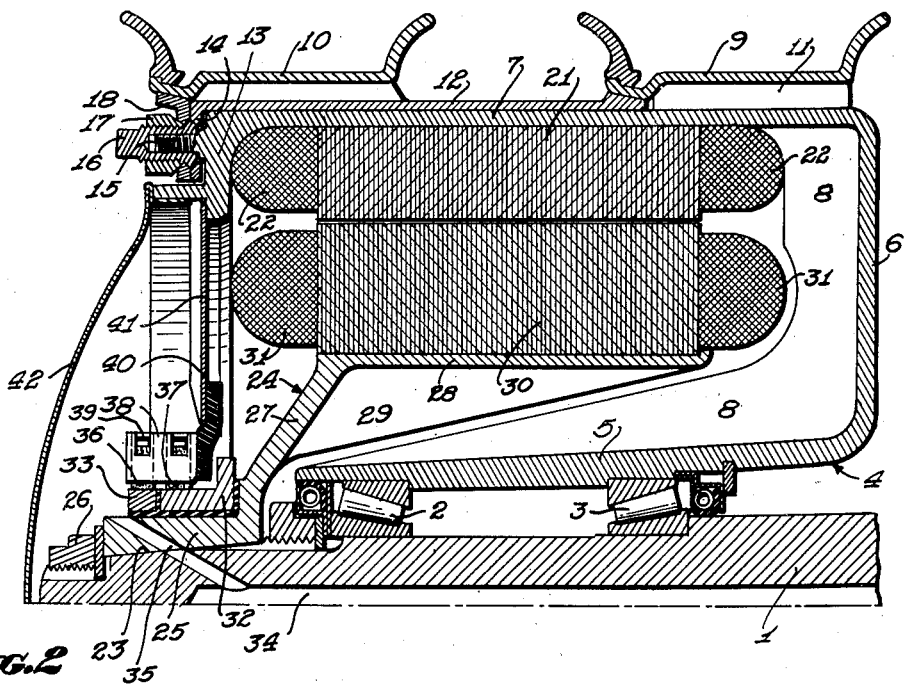
Figure 2 is an enlarged half-sectional view of the electric motor wheel taken through the line 2—2 of Figure 1.
Figure 1:
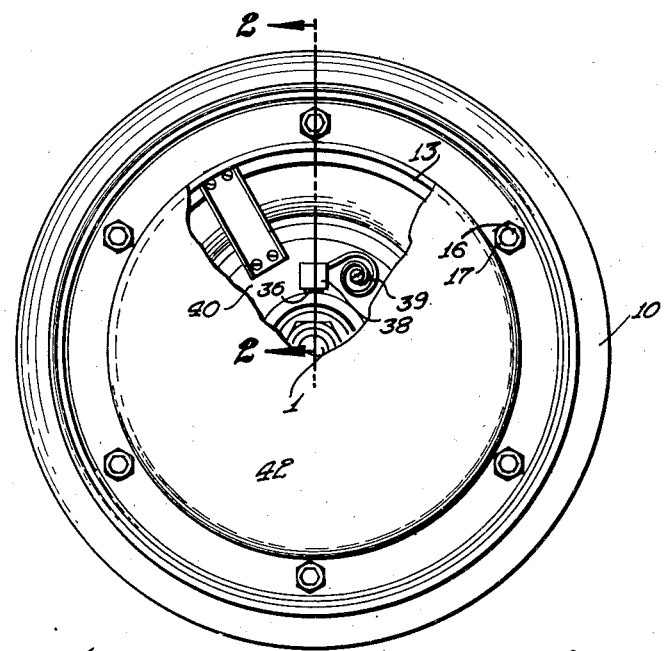
Figure 1 is a side view of my electric wheel, with the tires omitted but showing the tire rims in place, and with a portion of the motor cover plate broken away to show the commutator and collector ring.

Referring more in detail to the drawing, my electric motor wheel is mounted on a fixed axle shaft 1. Two conventional bearings 2 and 3, preferably tapered roller bearings, are mounted on the axle shaft. These support a wheel frame structure, indicated generally by 4.

The wheel frame structure includes a hub 5 of cylindrical form which fits over the bearings. At the axially inner end of the hub there is provided an outwardly radiating flange 6 which serves as a housing for one side of the electric motor. The radially outer periphery of the flange 6 is joined to the axially inner end of a felly 7. The felly is cylindrical in form and substantially centered with respect to the bearings 2 and 3. Ribs 8 provided along the radially outer side of the hub and axially outer side of the flange reinforce the frame structure.

The wheel frame structure shown is arranged to support two tire rims 9 and 10, which may be conventional in design and which carry in a conventional manner pneumatic tires, not shown.

The felly supports the inboard rim 9 on spacer lugs 11. The inboard rim is held in place by a suitable retainer 12 which may be in the form of a sleeve extending from the inboard rim over the axially outer end of the felly 7. The axially outer ends of the felly and retainer are provided with radially inwardly directed flanges 13 and 14 respectively, and the flange 13 of the felly is provided with axially outwardly directed stud bolts 15 which extend through holes in the flange 14. Nuts 16 secure the retainer to the felly.

The retainer 12 is provided with spacer lugs 17 which carry the outboard rim 10. The nuts 16 are in the form of cap nuts and provided with external threaded portions to receive other nuts 17. These engage lugs 18 which fit over the nuts 16 and which bear against the outboard rim 10.

Suitably secured around the radially inner side of the felly 7 are a plurality of field cores 21 of laminated iron. Each of these is encircled by field coils or windings 22.

The axle shaft 1 extends outwardly from the bearings 2 and 3 and forms a tapered portion 23 which carries an armature support indicated generally by 24 and which includes a complementarily tapered sleeve 25 held in place on the shaft by a nut 26 and secured against rotation by a suitable key, not shown. At the axially inner end of the sleeve 25 there is provided a radially outward and axially inwardly directed flange 27 which joins the sleeve 25 to an armature mounting shell 28 positioned radially outwardly from the hub 5. Ribs 29 reinforce the shell 28.

The shell 28 carries an armature core 30 with which is associated an armature coil or winding 31.

The sleeve 25 supports a commutator 32 and a slip ring 33. A current supply wire, not shown, extends through a bore 34 provided in the axle shaft and through a passage 35 extending laterally therefrom through the axle shaft and through the sleeve 26 so as to terminate axially outwardly from the slip ring and facilitate connection thereto, it being noted that the slip ring does not rotate but is fixed with respect to the axle shaft.

The commutator and slip ring are engaged respectively by brushes 36 and 37 which are mounted in suitable holders 38 and held in contact by springs 39. Additional holders and brushes, not shown, are provided for coaction with the commutator. The holders are mounted on a disk 40 of insulating material. The disk 40 is provided with suitable radiating struts 41 which are removably secured to the internal flange 13 at the axially outer end of the felly 7 so that the brushes are caused to rotate with the felly and the field of the electric motor.

A motor plate 42 is secured to the flange 13 and covers the axially outer side of the motor, commutator and axle shaft.

It should be noted that the electric motor incorporated in my wheel may be wound conventionally; that is, the number and arrangement of field cores and field coils, the nature of the armature and its winding or coil, the number and arrangement of brushes and their manner of contact with the slip ring and commutator may be conventional, consequently details concerning the electrical wiring of the motor unit are not shown.

By reason of the particular arrangement of the frame structure, not only is there provided a housing covering three sides of the motor; but also the housing is particularly large so that a motor of maximum horse power may be mounted therein. Furthermore, the relative mounting of the frame structure and armature support, places the center of torque of the electric motor unit in a plane centered between the bearings and the tires.

Also the commutator and brushes are made accessible by mere removal of a cover plate; the entire motor may be removed without disturbing the tires or removing the wheel; the armature and commutator assembly may be removed readily and quickly with actually less effort than changing a tire, thereby materially facilitating servicing of the electric motor wheel. Conversely, the tires may be readily changed without disturbing the electric motor unit.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications which may fall within the scope of the appended claims.

Having thus described my invention, what I claim and desire to secure by Letters Patent is:

1. An electric motor wheel comprising a non-rotating shaft, a wheel frame including hub and felly elements connected at their axially inner ends only, and an electric motor including a field secured to said felly and an armature and support therefor secured directly on said shaft axially outwardly from said hub for removal from said shaft independently of said hub.

2. An electric motor wheel comprising a non-rotating shaft, a wheel frame including a hub journaled on said shaft, a felly radially outwardly therefrom, and means connecting said hub and felly at their axially inner ends only, said hub, felly and connecting means forming three closed sides of an electric motor housing, and an electric motor including a field secured to said felly, at its radially inner side, an armature between said field and hub, and supporting means for said armature secured directly to said shaft beyond the axially outer end of said hub and independently thereof whereby said armature may be removed from said shaft without disturbing said wheel frame.

3. An electric motor wheel, comprising a non-rotating shaft, a wheel frame including a hub journaled on said shaft, a felly radially outwardly therefrom, and means connecting said hub and felly at their axially inner ends only, said hub, felly and connecting means forming three closed sides of an electric motor housing, and an electric motor including an armature support secured to said shaft axially outwardly from said hub, a commutator mounted on said support axially outwardly from said hub, an armature mounted on said support between said hub and felly, and a motor field secured on the radially inner side of said felly.

4. An electric motor wheel comprising a non-rotating shaft, a wheel frame including a hub journaled on said shaft, a felly radially outwardly therefrom, and means connecting said hub and felly at their axially inner ends only, said hub, felly and connecting means forming three closed sides of an electric motor housing, and an electric motor including an armature support secured to said shaft axially outwardly from said hub, a commutator mounted on said support axially outwardly from said hub, an armature mounted on said support between said hub and felly, and a motor field secured on the radially inner side of said felly, said electric motor including further a slip ring mounted adjacent said commutator, and an electric conductor conduit provided in said support and said shaft and terminating in proximity to said slip ring.

5. An electric motor wheel as set forth in claim 1 wherein the center of torque of said motor and the centers of load on said felly and said hub occupy a common plane.

6. An electric motor wheel as set forth in claim 2 wherein dual tire rims are mounted on said felly centered with respect to a plane passing through the journal center of said hub, and the center of torque of said motor substantially coincides with said plane.

7. An electric motor wheel as set forth in claim 3 wherein the center of torque of said hub occupies a plane common to the journal center of said hub, and said felly carries tire supporting means likewise centered with respect to said plane.

8. An electric motor wheel comprising a non-rotating shaft, a hub, bearing means journalling said hub on said shaft, an armature support secured to said shaft axially outwardly from said hub and telescoping axially over and around said hub, a felly surrounding said support and secured to said hub, tire supporting means on said felly, a rotating motor field secured to said felly, a fixed armature mounted on said support, said tire supporting means and said bearing means centered with respect to a common plane, and said armature and field having a center of torque substantially coinciding with said plane.

9. An electric motor wheel comprising a nonrotating shaft, a combined wheel frame and motor housing including a hub journaled on said shaft, a felly, a tire supporting means on said felly, and means connecting said hub and felly at their axially inner ends only, being an electric motor field unit mounted within said housing adjacent said felly, an armature support secured to said shaft axially outwardly of said housing and extending into said housing around said hub, and an armature assembly including an armature means and commutator mounted on said support, said housing being sufficiently open at its end opposite said connecting means to permit unitary removal of said support and armature assembly.

10. An electric motor wheel comprising a nonrotating shaft, a wheel frame including a hub journaled on said shaft, a felly radially outwardly therefrom, and means connecting said hub and felly at their axially inner ends only, said hub, felly and connecting means forming three closed sides of an electric motor housing, an electric motor including a field secured to said felly at its radially inner side, an armature between said field and hub, supporting means for said armature secured to said shaft beyond the axially outer end of said hub, dual tire rims mounted on said felly and centered with respect to a plane passing through the journal center of said hub, and said motor disposed with its center of torque substantially coinciding with said plane.

11. An electric motor wheel comprising a nonrotating shaft, a wheel frame including hub and felly elements connected at their axially inner ends only, an electric motor including field elements and an armature element, one of said elements supported within said felly, and a support for the other of said elements secured to said shaft axially outwardly of said hub and removable therefrom independently of said hub.

12. An electric motor wheel, comprising a nonrotating shaft, a wheel frame including a hub journaled on said shaft, a felly radially outwardly therefrom, and means connecting said hub and felly at their axially inner ends only, said hub, felly and connecting means forming three closed sides of an electric motor housing, an electric motor including a field element, an armature element and a commutator, one of said elements secured to the radially inner side of said felly, a support for one of said elements and said commutator, said support secured to said shaft axially outwardly from said hub and removable independently thereof.

13. An electric motor wheel, comprising a nonrotating shaft, a wheel frame including a hub journaled on said shaft, a felly radially outwardly therefrom, and means connecting said hub and felly at their axially inner ends only, said hub, felly and connecting means forming three closed sides of an electric motor housing, an electric motor including an armature element, a field element, a slip ring unit, and a commutator unit, a support for one of said elements and one of said units, said support secured to said shaft axially outwardly of and independently of said hub whereby said support and the element and unit carried thereby may be removed bodily without disturbing said wheel frame; the remaining element and unit of said motor being secured to the inner side of said felly.

OTTO E. DEVER.